United States Patent Office 3,097,425
Patented July 16, 1963

3,097,425
METHOD OF SOLDERING COPPER CONNECTION STRIPS TO COOLING THERMOPILE ELECTRODES
Evgeny Andreevich Kolenko, ul. Academica Pavlova, 14, Apt. 26; Andrey Georgievich Tauber, ul. Mahovaja 26, Apt. 25; and Anatoly Grigorievich Czerbina, Sapiorny per. 16, Apt. 53; all of Leningrad, U.S.S.R.
No Drawing. Filed Apr. 15, 1960, Ser. No. 23,879
1 Claim. (Cl. 29—492)

This invention relates to a method of soldering copper connection strips to cooling thermopile electrodes.

The existing method of joining copper connection strips to semiconductor thermopile electrodes does not insure long service of the devices because solder joining of materials (copper to electrode alloy) which posses greatly different coefficients of linear expansion results in the appearance of microcracks in the joint after a short period of service of the thermopile, impairs its functioning and leads to its premature failure.

The object of this invention is a method of soldering copper connection strips to cooling thermopiles which differs in that the electrodes are preliminarily coated with a buffer layer of relatively higher melting point alloy to which the connection strips are subsequently soldered.

The method proposed herein for the joining of copper strips to thermopile electrodes is aimed towards overcoming the shortcoming stated above. In accordance with this invention, with the aid of a soldering torch or any other method a 0.2 to 0.3 mm. thick buffer layer of a relatively high melting point alloy is applied to the thermopile electrode. This alloy contains, for example, 99 percent of bismuth and 1 percent of tin. The buffer layer of alloy serves to take up the mechanical stresses developed in the joint owing to periodic thermal shock and precludes the appearance of microcracks. The copper connection strips are soldered to the buffer layer surface in the usual way, solder used for this purpose, in this case, is Wood's alloy or some other alloy with a melting point not over 140° C.

What we claim is:

A method of soldering copper conductor strips to cooling thermopile electrodes comprising applying 0.2 to 0.3 mm. thick coating of an alloy of 99% bismuth and 1% tin to a thermopile electrode, then soldering a copper conductor onto the coating employing an alloy having a melting point which does not exceed 140° C.

References Cited in the file of this patent
UNITED STATES PATENTS

| | | |
|---|---|---|
| 2,289,152 | Telkes | July 7, 1942 |
| 2,381,819 | Graves et al. | Aug. 7, 1945 |
| 2,811,571 | Fritts et al. | Oct. 29, 1957 |
| 2,877,283 | Justi | Mar. 10, 1959 |
| 2,924,976 | Barbiskin et al. | Feb. 16, 1960 |
| 2,953,617 | Heikes et al. | Sept. 20, 1960 |
| 3,017,693 | Haba | Jan. 23, 1962 |

OTHER REFERENCES

U.S. Bureau of Standards, Circular No. 382, April 2, 1930, pages 6, 7, and 26.